United States Patent
Bäuerlein

[19]

[11] Patent Number: 6,077,627

[45] Date of Patent: Jun. 20, 2000

[54] POLYMER ELECTROLYTE AND METHOD FOR PREPARING SAME

[75] Inventor: Peter Bäuerlein, Bad Camber, Germany

[73] Assignee: Varta Batterie Aktiengesellschaft, Hannover, Germany

[21] Appl. No.: 08/987,079

[22] Filed: Dec. 9, 1997

[30] Foreign Application Priority Data

Dec. 14, 1996 [DE] Germany .............. 196 52 174

[51] Int. Cl.$^7$ .............. H01M 6/18; H01M 6/24; H01M 10/28

[52] U.S. Cl. .............. 429/309; 429/306; 429/307; 429/324

[58] Field of Search .............. 429/192, 33, 191, 429/194, 218, 212, 306, 307, 309, 324

[56] References Cited

U.S. PATENT DOCUMENTS

| | | |
|---|---|---|
| 4,210,709 | 7/1980 | Doi .............. 429/250 |
| 4,335,193 | 6/1982 | Doi .............. 429/251 |
| 5,296,318 | 3/1994 | Gozdz et al. . |
| 5,418,091 | 5/1995 | Gozdz et al. . |
| 5,429,891 | 7/1995 | Gozdz et al. . |
| 5,641,565 | 6/1997 | Sogo .............. 428/315 |

*Primary Examiner*—Stephen Kalafut
*Assistant Examiner*—Mark Ruthkosky
*Attorney, Agent, or Firm*—Schnader Harrison Segal & Lewis LLP

[57] ABSTRACT

The invention relates to a method for preparing polymer electrolytes for rechargeable lithium intercalation cells which contain a dissociable lithium salt dispersed in a polymeric matrix, the polymeric matrix being a self-supporting film of a copolymer of vinylidene difluoride and hexafluoropropylene, in which the plasticizer is exchanged for a solution of the dissociable lithium salt, so that the polymeric electrolyte 20 to 70 wt % of the solution of the dissociable lithium salt, and is characterized in that a plasticizer is used which is stable under the electrochemical conditions of a rechargeable lithium intercalation cell and is selected from the group consisting of hexylene carbonate, octylene carbonate or tributyl phosphate.

18 Claims, 3 Drawing Sheets

POLYMER ELECTROLYTE AND METHOD FOR PREPARING SAME

BACKGROUND OF THE INVENTION

1. Field of the Invention

The invention relates to a method for preparing polymer electrolytes for rechargeable lithium intercalation cells which contain a solution of a dissociable lithium salt dispersed in a polymeric maxtrix.

2. Description of the Related Art

Polymer electrolytes, methods for their preparation, and their use are disclosed by U.S. Pat. Nos. U.S. Pat. No. 5,296,318, U.S. Pat. No. 5,418,091 and U.S. Pat. No. 5,429,891. The polymer electrolytes obtained in accordance with the known methods can be used as a separator in secondary lithium cells, the material at the same time assuming the function of the electrolyte. The solid polymer electrolytes (SPE) thus represent a combination of separator and immobilized electrolyte. These can be used, in particular, in lithium intercalation cells, also known as lithium-swing or rocking-chair cells. Compared with other separators, the solid polymer electrolytes, owing to their electrolyte content and only slight tendency to flow, are particularly suitable for the construction of galvanic cells whose electrode and separator thicknesses are in the range of from 80 to 250 $\mu$m.

According to the known methods the plasticizers used in the preparation of polymer electrolytes are exchanged for a solution of the dissociable lithium salt such as $LiPF_6$, $LiClO_4$ or $LiBF_4$ (also referred to as conducting salts) in organic solvent mixtures such as ethylene carbonate (EC)/dimethyl carbonate (DMC), propylene carbonate (PC)/diethyl carbonate (DEC), dimethoxyethane (DME) or dipropyl carbonate (DPC). This preferably involves extraction of the plasticizers by solvents in which the starting polymer is insoluble, such as diethyl ether, hexane, Freon 113 or methanol. The polymer film is then dried. Impregnation of the polymer film with a solution of the dissociable lithium salt can take place both separately and after lamination of the electrodes with a polymer electrolyte.

It is further known to use, as the plasticizer, a mixture of the abovementioned solvents and conducting salts dissolved therein, said mixture being referred to as a liquid electrolyte and being trapped within the polymer matrix being formed.

SUMMARY OF THE INVENTION

It is an object of the present invention to simplify the known methods for preparing polymer electrolytes. The invention relates to a method for preparing polymer electrolytes for rechargeable lithium intercalation cells which contain a solution of a dissociable lithium salt dispersed in a polymeric matrix, the polymeric matrix being a self-supporting film of a copolymer of vinylidene difluoride and hexafluoro-propylene (PVDF-HFP copolymer), in which the plasticizer is exchanged for a solution of the dissociable lithium salt in an organic solvent, so that the content of the solution of the dissociable lithium salt in the polymeric matrix is 20–70 wt %.

It was found that the polymer electrolytes prepared with electrolyte solvents such as propylene carbonate, ethylene carbonate or dimethyl carbonate as plasticizers do not exhibit the diaphragm conductivity aimed for and that the polymer electrolytes prepared with other plasticizers have to be subjected to complete extraction of these plasticizers, since the plasticizers are not electrochemically stable under the electrochemical conditions within a lithium intercalation cell and result in rapid capacity loss of the cells. The invention proposes the use, during the preparation of the polymer electrolytes, of plasticizers which are stable under the electrochemical conditions of a lithium intercalation cell and are selected from the group consisting of hexylene carbonate (HC), octylene carbonate (OC) or tributyl phosphate (TBP).

A particularly advantageous way of implementing the method involves a direct exchange of the plasticizer for the solution of the dissociable salt. In the process the plasticizer is not first extracted with a solvent in which only the plasticizer and not the polymer is soluble, followed by drying of the polymer film, but instead the polymer containing the plasticizer is immersed in an electrolyte solution, the direct exchange of the plasticizer for the electrolyte thus being effected.

Advantageously, from 1 to 20 wt % of the plasticizer may, in the process, remain in the polymer electrolyte.

BRIEF DESCRIPTION OF THE DRAWINGS

The invention is explained below in more detail with reference to 3 figures, in which.

DETAILED DESCRIPTION

The test cells were produced in which the anode consists of 56 wt % of carbon material,
16 wt % of PVDF-HFP copolymer,
3 wt % of conductive black and
25 wt % of plasticizer;

the cathode consists of 56 wt % of metal oxide,
15 wt % of PVDF-HFP copolymer,
6 wt % of conductive black and
23 wt % of plasticizer and the separator consists of 20 wt % of filler ($SiO_2$),
30 wt % of PVDF-HFP copolymer and
50 wt % of plasticizer.

The carbon material used was coke or graphite. Metal oxides were selected from the group consisting of $LiCoO_2$, $LiNiO_2$ or $LiMn_2O_4$.

Figure 1:
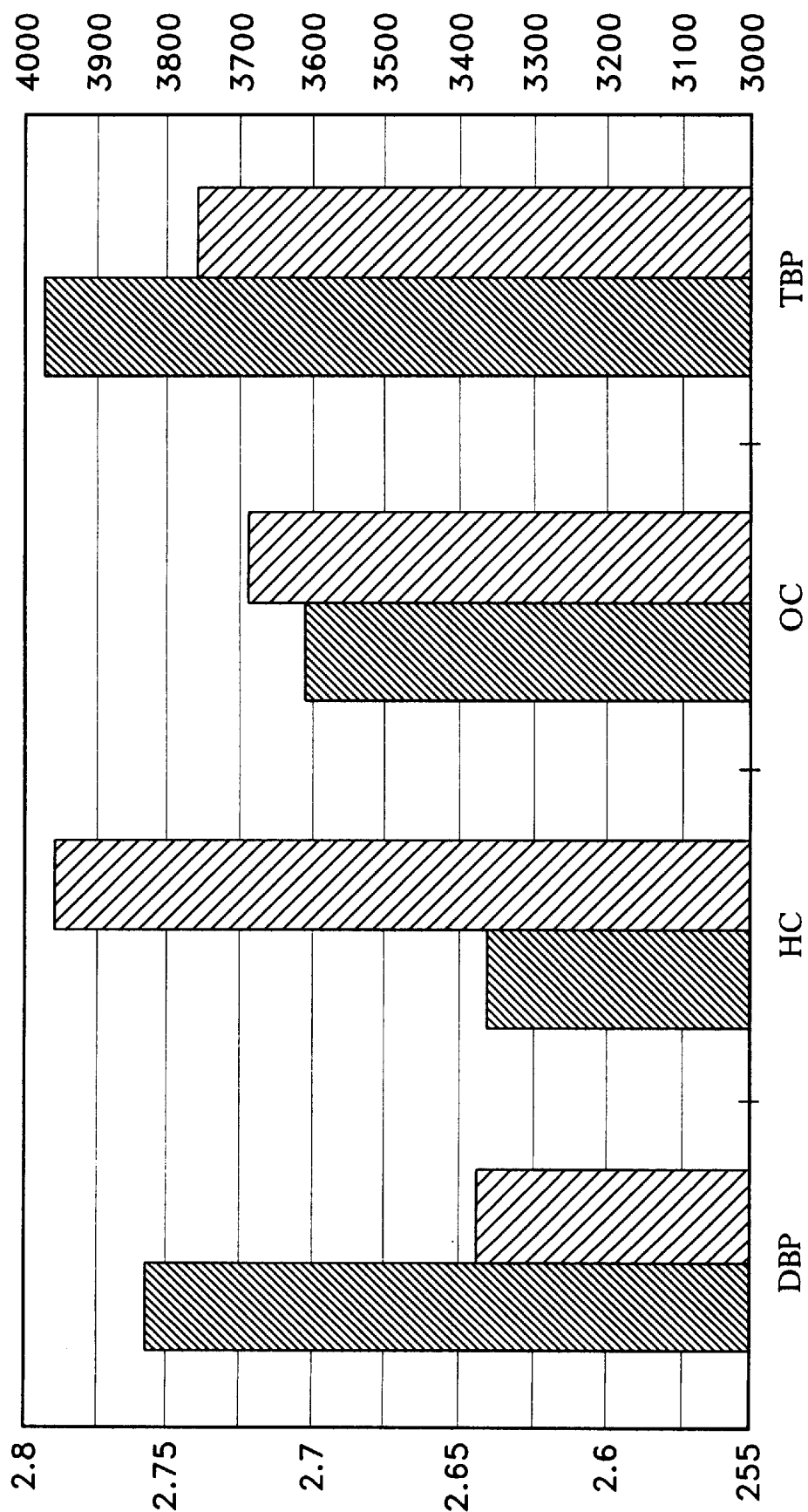
FIG. 1 shows how the conductivity and the electrolyte uptake depends on the plasticizer used.
Figure 2:
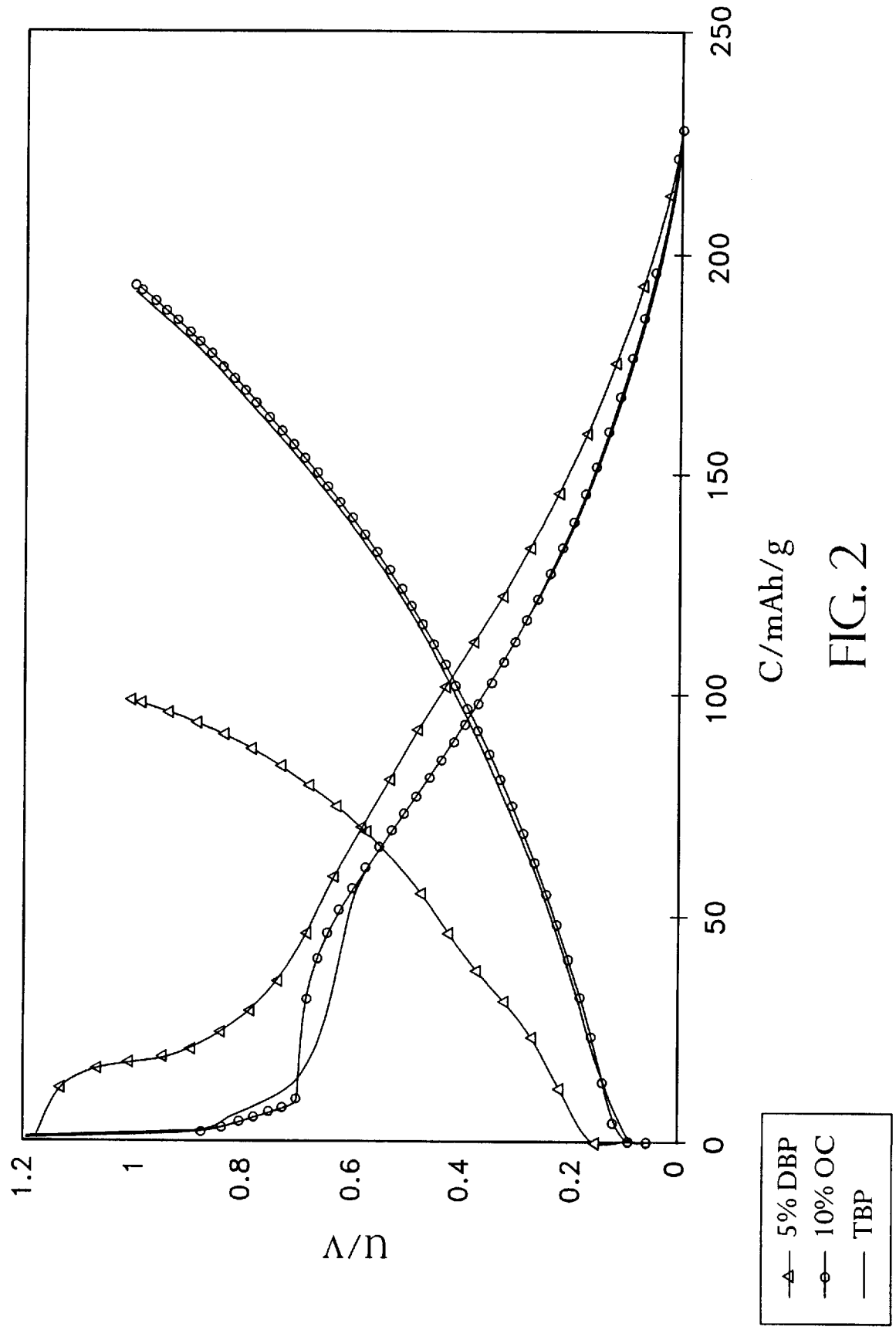
FIG. 2 shows the effect of the plasticizer on the negative electrode.
Figure 3:
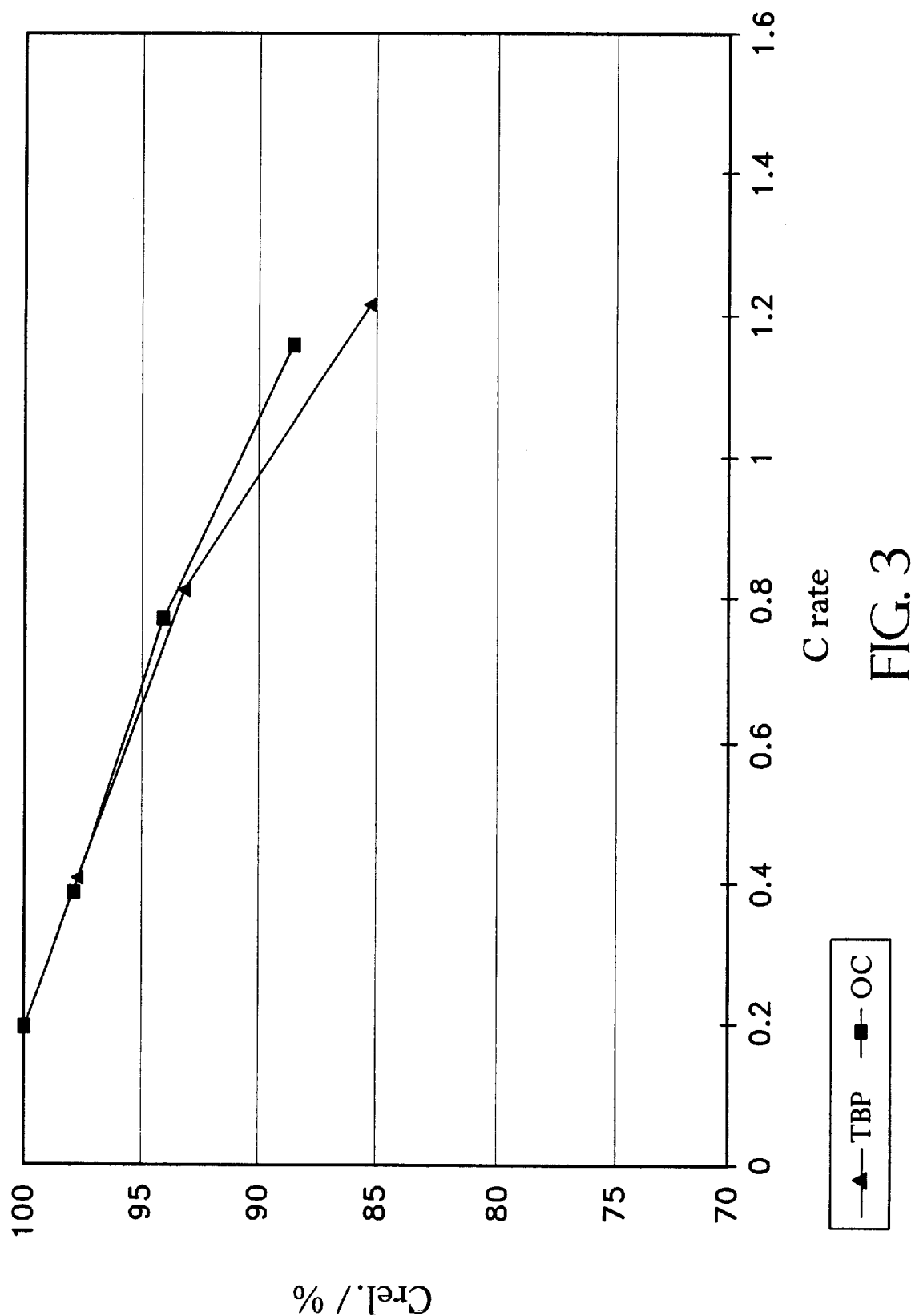
FIG. 3 shows the capacity as a function of the load for a complete cell according to the invention.

The lithium content in the polymer electrolyte was determined by atomic emission spectroscopy (AES), and the diaphragm conductivity was determined by samples, surrounded by liquid electrolyte, of the solid polymer electrolyte being clamped between two alloy steel electrodes having surface areas of 10 $cm^2$, the spacing between the plates being defined by the thickness of the sample to be measured. At a bearing pressure of 9.8 $N/cm^2$ an impedance spectrum is then recorded. The measurement of galvanostatic charging and discharge was carried out in compressed flat cells at a bearing pressure of 50.0 $N/cm^2$. The counter-electrodes used were lithium metal foils having a thickness of 250 $\mu$m, which are insulated from the counter-electrode by two layers of separator. The electrolytes were standard electrolytes (1 molar $LiPF_6$ in EC/DMC 65:35), which contained y wt % of a plasticizer according to the invention. FIG. 1 shows a comparison of the electrolyte uptake (right-hand columns of the graph on the basis of the lithium content) and the conductivities (left-hand columns of the graph) in solid polymer electrolytes as a function of the plasticizer employed. Used as a reference was a sample containing dibutyl phthalate (DBP) known from the prior art. FIG. 2 shows the effect of the plasticizer on the electrochemistry of the negative electrode, curve 1 being obtained with the addition of 5 wt % of DBP, curve 2 with the addition of 10 wt % of OC and curve 3 with the addition of 10 wt % of TBP. FIG. 3 depicts the capacity as a function of the load for complete cells (solid polymer electrolyte—SPE complete cells) which contain polymer electrolytes comprising the plasticizers according to the invention, OC or TBP, where the capacity measured for discharge over five hours is defined as a capacity of 100% and the drop in capacity as a function of higher discharge currents is evaluated.

What is claimed is:

1. A method for preparing a polymer electrolyte for a rechargeable lithium intercalation cell, having improved diaphragm conductivity and reduced internal resistance, which comprises immersing a polymer containing a plasticizer stable under electrochemical conditions of the rechargeable lithium intercalation cell and selected from the group of hexylene carbonate (HC), octylene carbonate (OC) and tributyl phosphate (TBP) into an electrolytic solution of a dissociable lithium salt in an organic solvent, directly and incompletely exchanging the plasticizer for the solution of the dissociable lithium salt, and generating a polymer electrolyte containing 20–70 wt. % of the solution of the dissociable lithium salt and still containing a residual of 1–20 wt. % of plasticizer, whereby the cell contains a dissociable lithium salt dispersed in a polymeric matrix, the polymeric matrix being a self-supporting film of a copolymer of vinylidene difluoride and hexafluoro-propylene.

2. The method of claim 1, wherein the plasticizer is tributyl phosphate (TBP).

3. The method of claim 2, wherein from 1 to 10 wt. % of the tributyl phosphate (TBP) plasticizer residual remains in the polymer electrolyte.

4. The method of claim 1, wherein from 1 to 10 wt. % of the plasticizer residual remains in the polymer electrolyte.

5. A rechargeable lithium intercalation cell prepared using the method of claim 1.

6. A rechargeable lithium intercalation cell prepared using the method of claim 2.

7. A rechargeable lithium intercalation cell prepared using the method of claim 3.

8. A rechargeable lithium intercalation cell prepared using the method of claim 4.

9. A rechargeable lithium intercalation cell having diaphragm conductivity and reduced internal resistance, comprising a polymer electrolyte which contains a dissociable lithium salt dispersed in a polymeric matrix, the polymeric matrix bring a self-supporting film of a copolymer of vinylidene diflouride and hexafluoro-propylene, in which the polymer electrolyte contains 20–70 wt. % of a solution of a dissociable lithium salt and a residual of 1–20 wt. % of plasticizer selected from the group of hexylene carbonate (HC), octylene carbonate (OC) and tributyl phosphate (TBP), said plasticizer being stable under electrochemical conditions of the rechargeable lithium intercalation cell, said polymer electrolyte being generated by a direct and incomplete exchange of the plasticizer for the solution of the dissociable lithium salt in an organic solvent.

10. The cell of claim 9, wherein the plasticizer is tributyl phosphate (TBP).

11. The cell of claim 10, wherein from 1 to 10 wt % of the tributyl phosphate (TBP) plasticizer residual remains in the polymer electrolyte.

12. The cell of claim 9, wherein from 1 to 10 wt % of the plasticizer residual remains in the polymer electrolyte.

13. The method of claim 1, wherein the polymer electrolyte is a solid.

14. The method of claim 1, wherein the polymer electrolyte is a film.

15. The cell of claim 10, wherein the polymer electrolyte is a solid.

16. The cell of claim 10, wherein the polymer electrolyte is a film.

17. A method for preparing a polymer electrolyte for a rechargeable lithium intercalation cell, having improved diaphragm conductivity and reduced internal resistance, which comprises immersing a polymer containing a plasticizer stable under electrochemical conditions of the rechargeable lithium intercalation cell and selected from the group of hexylene carbonate (HC) and octylene carbonate (OC) into an electrolytic solution of a dissociable lithium salt in an organic solvent, directly and incompletely exchanging the plasticizer for the solution of the dissociable lithium salt, and generating a polymer electrolyte containing 20–70 wt. % of the solution of the dissociable lithium salt and still containing a residual of 1–20 wt. % of plasticizer, wherein the polymer electrolyte contains a dissociable lithium salt dispersed in a polymeric matrix, the polymeric matrix being a self-supporting film of a copolymer of vinylidene difluoride and hexafluoro-propylene 18. A rechargeable lithium intercalation cell having improved conductivity and reduced internal resistance, comprising a polymer electrolyte which contains a dissociable lithium salt dispersed in a polymeric matrix, the polymeric matrix being s self-supporting film of a copolymer of vinylidene difluoride and hexafluoro-propylene, in which the polymer electrolyte contains 20–70 wt. % of a solution of a dissociable lithium salt and a residual of 1–20 wt. % of plasticizer selected from the group of hexylene carbonate (HC) and octylene carbonate (OC) said plasticizer being stable under electrochemical conditions of the rechargeable lithium intercalation cell, said polymer electrolyte being generated by a direct and incomplete exchange of the plasticizer, for the solution of the dissociable lithium salt in an organic solvent.

\* \* \* \* \*